US009737800B1

(12) United States Patent
Milligan et al.

(10) Patent No.: US 9,737,800 B1
(45) Date of Patent: *Aug. 22, 2017

(54) SYSTEM AND METHOD FOR DYNAMICALLY MANAGING SOUND IN A GAMING ENVIRONMENT

(71) Applicant: Video Gaming Technologies, Inc., Franklin, TN (US)

(72) Inventors: Dan Milligan, Franklin, TN (US); Ben Lechlitner, Franklin, TN (US); Chris Jarrell, Franklin, TN (US); Chris Thacker, Franklin, TN (US); Scott Winzeler, Franklin, TN (US)

(73) Assignee: VIDEO GAMING TECHNOLOGIES, INC., Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/408,024

(22) Filed: Jan. 17, 2017

Related U.S. Application Data

(63) Continuation of application No. 15/175,910, filed on Jun. 7, 2016, now Pat. No. 9,569,923, which is a (Continued)

(51) Int. Cl.
*A63F 13/35* (2014.01)
*A63F 13/25* (2014.01)
(Continued)

(52) U.S. Cl.
CPC .............. *A63F 13/25* (2014.09); *A63F 13/35* (2014.09); *A63F 13/63* (2014.09); *G10K 11/175* (2013.01); *H04R 27/00* (2013.01); *H04S 7/30* (2013.01); *H04R 2227/003* (2013.01)

(58) Field of Classification Search
CPC .......... A63F 13/25; A63F 13/35; A63F 13/63; G10K 11/175; H04R 27/00; H04R 7/30
See application file for complete search history.

(56) References Cited

U.S. PATENT DOCUMENTS 6,638,169 B2 10/2003 Wilder et al.
6,805,633 B2 10/2004 Hein, Jr. et al.
(Continued)

*Primary Examiner* — Corbett B Coburn
(74) *Attorney, Agent, or Firm* — Patterson Intellectual Property Law, P.C.; Gary L. Montle

(57) ABSTRACT

A gaming system is configured for dynamic and location-specific management of sound in a gaming environment. Various gaming stations, each including sound receivers and sound emitters, are disposed across multiple gaming zones. A server communicates with the gaming stations and is configured to sample ambient sounds with respect to the plurality of zones, and identify zone-specific exception sound signatures with respect to a dynamic noise threshold for at least a first of the plurality of zones, such as for example a jackpot or equivalent "hot spot" in the gaming environment. One or more gaming machines external to the first zone are directed to locally amplify sounds associated with the identified zone-specific exception sound signatures for the first zone. The server may further direct sound emitters external to the first zone to emit sound waves effective to locally suppress particular ambient sounds other than the identified zone-specific exception sound signatures.

20 Claims, 7 Drawing Sheets

Related U.S. Application Data continuation of application No. 14/700,591, filed on Apr. 30, 2015, now Pat. No. 9,370,720, which is a continuation of application No. 13/834,342, filed on Mar. 15, 2013, now Pat. No. 9,055,375.

(51) Int. Cl.
*H04R 27/00* (2006.01)
*H04S 7/00* (2006.01)
*G10K 11/175* (2006.01)
*A63F 13/63* (2014.01)

(56) References Cited

U.S. PATENT DOCUMENTS

| | | | |
|---|---|---|---|
| 6,968,063 | B2 | 11/2005 | Boyd |
| 7,112,139 | B2 | 9/2006 | Paz Barahona et al. |
| 7,364,508 | B2 | 4/2008 | Loose et al. |
| 8,167,826 | B2 * | 5/2012 | Oohashi ............... A61M 21/02 601/2 |
| 8,184,824 | B2 | 5/2012 | Benbrahim et al. |
| 2006/0140420 | A1 | 6/2006 | Machida |
| 2006/0229121 | A1 | 10/2006 | Rasmussen et al. |
| 2006/0262935 | A1 | 11/2006 | Arman et al. |
| 2007/0041589 | A1 * | 2/2007 | Patel .................. H04M 1/6066 381/73.1 |
| 2007/0297620 | A1 | 12/2007 | Choy |
| 2010/0317437 | A1 * | 12/2010 | Berry ..................... G07F 17/32 463/35 |
| 2011/0002476 | A1 * | 1/2011 | Morishima .......... G10K 11/178 381/71.6 |
| 2011/0152729 | A1 * | 6/2011 | Oohashi ............... A61M 21/02 601/2 |

* cited by examiner

SYSTEM AND METHOD FOR DYNAMICALLY MANAGING SOUND IN A GAMING ENVIRONMENT

CROSS-REFERENCES TO RELATED APPLICATIONS

This application is a continuation of co-pending U.S. patent application Ser. No. 15/175,910, filed Jun. 7, 2016, which was a continuation of U.S. patent application Ser. No. 14/700,591 (now U.S. Pat. No. 9,370,720), filed Apr. 30, 2015, which was further a continuation of U.S. patent application Ser. No. 13/834,342 (now U.S. Pat. No. 9,055,375), filed Mar. 15, 2013.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The present invention relates generally to sound management in gaming environments.

More particularly, the present invention relates to a local network of gaming systems that interact for the purpose of dynamic sound management for the benefit of users of individual gaming machines.

BRIEF SUMMARY OF THE INVENTION

In accordance with various embodiments of a gaming system as disclosed herein, sound cancellation and/or amplification is incorporated into a gaming device or surrounding devices in a current location to block noise from reaching the user's ears and/or amplify desired sounds.

In one aspect of a gaming system as described herein, 3D sound is projected from the gaming device to the patron to maximize their enjoyment of the game. This could be either produced as a sound wave reaching out from the device to the patron or pushed wirelessly to headphones, for example, and projected to the patron on top of the noise cancellation wave(s).

In an embodiment, a gaming system is configured for dynamic and location-specific management of sound in a gaming environment. Various gaming stations, each including sound receivers and sound emitters, are disposed across multiple gaming zones. A server communicates with the gaming stations and is configured to sample ambient sounds with respect to the plurality of zones, and identify zone-specific exception sound signatures with respect to a dynamic noise threshold for at least a first of the plurality of zones, such as for example a jackpot or equivalent "hot spot" in the gaming environment. One or more gaming machines external to the first zone are directed to locally amplify sounds associated with the identified zone-specific exception sound signatures for the first zone. The server may further direct sound emitters external to the first zone to emit sound waves effective to locally suppress particular ambient sounds other than the identified zone-specific exception sound signatures.

These aspects can address one of the biggest issues with sound cancellation, which is the determination of what is noise and what is valuable data.

DETAILED DESCRIPTION OF THE INVENTION

Figure 1:
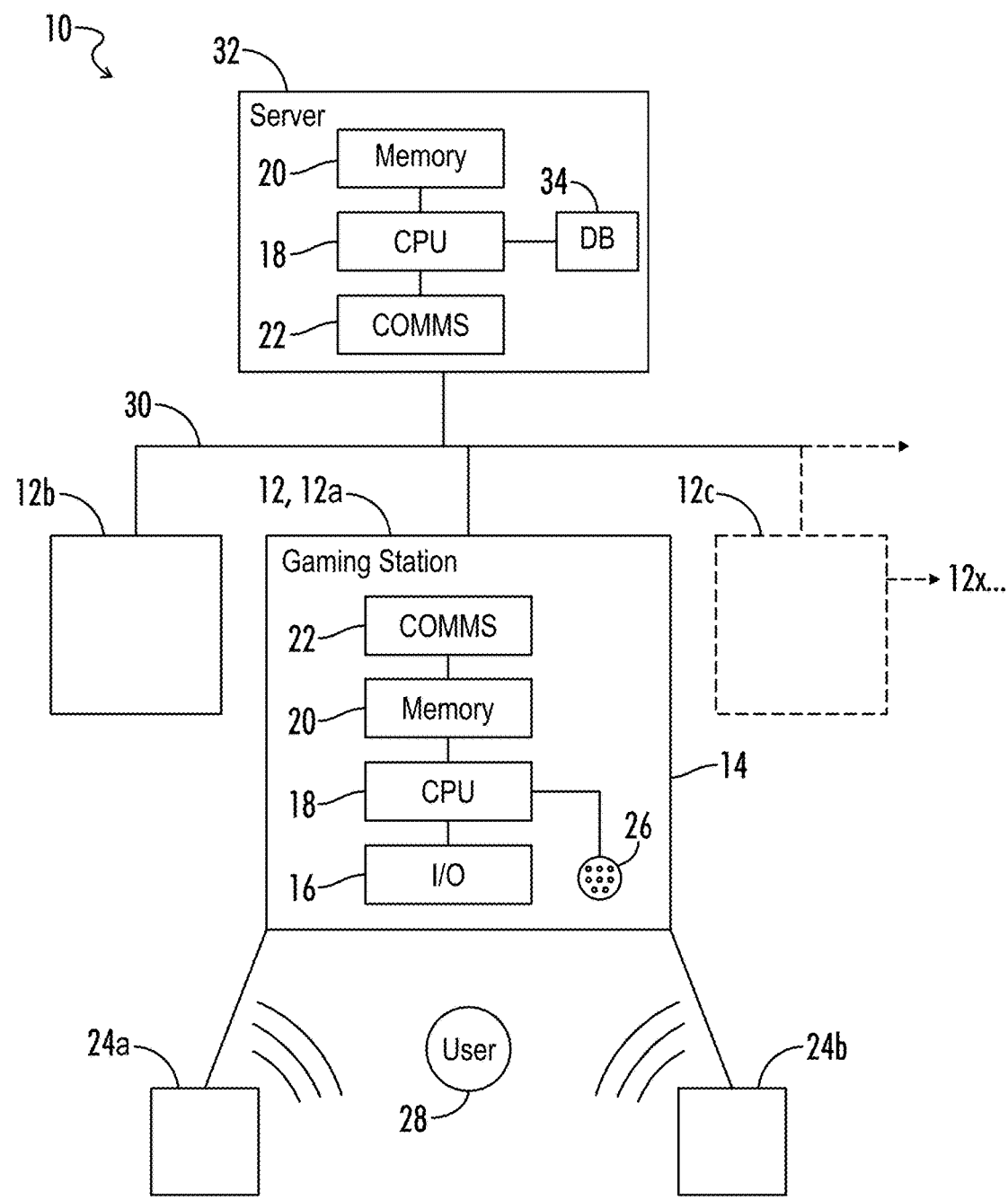
FIG. 1 is a block diagram representing an exemplary embodiment of a gaming system as disclosed herein.

Referring generally to FIGS. 1-7, various embodiments of a gaming system and method according to the present invention may now be described. Where the various figures may describe embodiments sharing various common elements and features with other embodiments, similar elements and features are given the same reference numerals and redundant description thereof may be omitted below.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

Depending on the embodiment, certain acts, events, or functions of any of the algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Referring first to an embodiment as represented in FIG. 1, an exemplary gaming system 10 includes a central server 32 and a plurality of gaming stations 12 for one or more users. The server 32 and user stations 12 may be coupled to each other via a communications network 30. The system 10 may be provided for fixed gaming stations in a defined gaming area such as, for example, a casino floor, but may further be provided for any mobile or fixed gaming stations in undefined or lesser-defined areas, including but not limited to coffee shops, airports, or wherever else the user may be connected to the server 32 and/or other user stations 12 via a communications network 30.

The term "communications network" 30 as used herein may typically refer to a wired or wireless local area network (LAN), but may within the scope of the present invention incorporate wide area networks (WAN) or other telecommunications implemented communications networks and associated media including for example the Internet for the purposes of at least data transmission and reception. The communications network 30 may include or otherwise interact with network devices, connectors, and other hardware and/or software components 22 associated with individual computing devices 12, 32 on either end of the network 30.

The user stations 12 may include a gaming terminal 14 having a user interface 16, a processing unit 18, one or more computer-readable media 20, and any components 22 as needed for appropriate interaction with the communications network 30. As referenced above, the user stations 12 may be fixed in location with respect to for example a casino floor, but may alternatively be mobile in nature such as for example where implemented via a mobile computing device having appropriate structure to incorporate and implement components and features described herein.

Sound receiving devices 26 such as for example an array of microphones and associated circuitry may be positioned with respect to each user station 12 and functionally linked to the corresponding processing unit 18.

Sound emitting devices 24 are further positioned with respect to each user station 12 and functionally linked to the corresponding processing unit 18. In various embodiments, the sound emitting devices 24 are configured for projecting sound waves as noise cancellation waves that are further effective to cancel out certain sounds. Sound cancellation may be incorporated into for example the headrest of a patron's seat or elevated rear speakers to block noise from reaching their ears. Three-dimensional (3D) sound may further be projected by the user station 12 to the patron 28 to maximize their enjoyment of the game, and may be produced via a device 24 inside the machine 14 as a sound wave reaching out to the patron 28 or pushed wirelessly to static speakers 24 associated with the user station such as, for example, the seat/head rest/rear speakers 24a, 24b and projected to the patron 28 on top of the noise cancellation wave(s). Alternatively, for either static or mobile applications the sound wave may be provided via Bluetooth or an equivalent wireless communication technology to a wireless user headset paired with a gaming application.

An exemplary central server 32 as represented in FIG. 1 may include a processing unit 18, computer-readable media 20, and any components 22 as needed for appropriate interaction with the communications network 30. The server 32 may further include or otherwise be functionally linked to one or more databases 34, data repositories or equivalent data storage media, wherein data associated with the various user stations, zones and/or the various users themselves may be stored and subsequently retrieved. User profiles may be maintained wherein user preferences are stored in the server 32 and applicable by the system in accordance with various user stations, locations, times, etc., as further described below. Exemplary databases 34 or other dedicated storage media within the scope of the invention may include without limitation transactional databases or data files wherein raw data may be stored, informational databases (e.g., data warehouses) for aggregation and analysis of raw data by downstream analytics or business intelligence program engines, some combination thereof as may be understood by those of skill in the art, and any associated program engines as needed to extract, transform and load raw data into an informational or business intelligence-related format.

Figure 2:
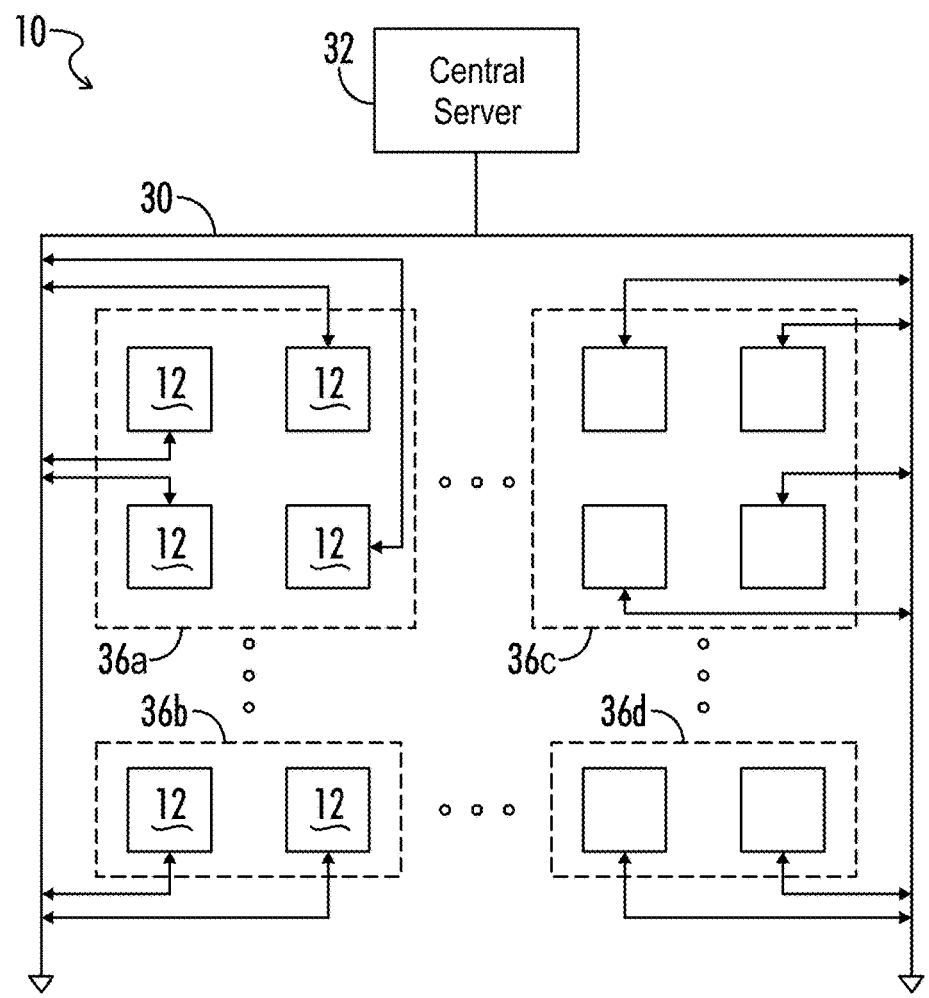
FIG. 2 is a block diagram representing another exemplary embodiment of a gaming system as disclosed herein, the system defining a plurality of gaming zones.

Referring next to FIG. 2, a system 10 substantially as described above with respect to FIG. 1 may in various embodiments of the present invention further be expanded in scope to define a plurality of zones 36, each zone including one or more user stations 12. In an exemplary embodiment, the zones may define portions of a single gaming area such as a casino floor. In other embodiments, the zones may each independently represent alternative locations such as for example cafes, train stations, airports, or any other place where mobile gaming applications may be executed by a user, and some or all of which may further have default profiles containing ambient sounds associated with the respective location or type of location. For example, as a default measure it may be assumed that an airport provides certain common sounds that can be programmed for identification and suppression when a user gaming terminal is active therein, while for example a coffee shop may be expected to have a somewhat different default profile of common ambient sounds.

Each station 12 is still coupled to the server 32 via the communications network 30, and may otherwise be substantially identical in configuration with respect to the relatively more detailed description above. As represented in FIG. 2, the devices only communicate with the central server, but in certain embodiments, it may be desirable for each station 12 in a particular zone 36 to communicate with other stations 12 in the same zone. In other embodiments, the stations 12 may all communicate with each other, but with a corresponding zone being included as a parameter in a data string whereby each station 12 may appropriately identify the source zone for each other station 12.

The server 32 may effectively serve as a "master" to thereby coordinate noise cancellation, specific exceptions and the like among the various zones and their associated user stations in accordance with features and supporting program modules and algorithms as may be described further below. In certain embodiments, the various user stations 12 may themselves have the ability to interact directly with each other to generate and execute many of the same sound analysis and noise cancellation steps, unless for example overruled or otherwise disabled by commands from the central server.

Figure 3:
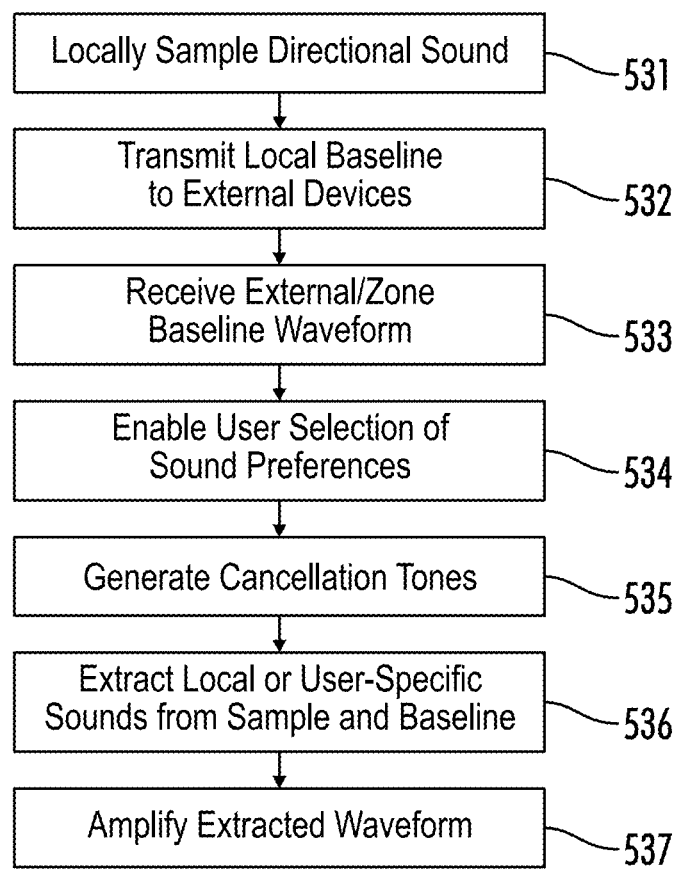
FIG. 3 is a flowchart representing an exemplary embodiment of a method of operation as disclosed herein.

Referring now to FIG. 3, an exemplary embodiment of a dynamic noise cancellation process may now be described as it may pertain to an individual user station according to the present invention. The steps recited herein are intended as exemplary only, and not as limiting on the scope of the present invention unless otherwise explicitly stated. The steps may further be performed in any order unless otherwise explicitly stated or as logically dictated.

When a gaming station starts up, it typically may first sample ambient sounds with respect to that particular station (S31). As described above, the sample is typically obtained via sound receiving devices such as for example microphones, transducers or the like, and preferably an array of such devices for greater accuracy. The array of devices may be configured and arranged such that the sampled ambient noise pertains not only to the sounds projected by the particular gaming machine but also ambient noise received from external areas. A local audio file may then be generated by the processing unit in the gaming station, which includes data that may therefore be representative of the ambient sounds and to some extent any local directional impact from external sounds with respect to the gaming station. In other words, when the local audio file is analyzed in conjunction with audio files from adjacent gaming stations, a particular source of noise may be identified and accordingly compensated for in subsequent steps. Further, each gaming station may be programmed to be sensitive to frequencies associated with human speech generally, wherein analysis of the various audio files may allow for identification and either suppression or amplification of human speech.

In certain embodiments, the gaming station may be effective to distinguish between the signatures of various sources within the range of frequencies associated with human speech, wherein for example speakers substantially within a certain radius about the gaming station may be amplified and sounds from speakers outside of the station are suppressed. In certain embodiments, the user may be enabled to select and suppress individual signatures that may be directionally identified and therefore distinguished from other signatures in the combined waveform. For example, where a particular speaker produces sounds of a particular frequency, the sounds may be positively identified via triangulation and synthesis of a plurality of local audio files and automatically suppressed by the gaming station as a default measure or as desired in accordance with user preferences.

Having generated a local audio file, the gaming station may next transmit the audio file to its neighboring devices and a central server (S32). In various embodiments, the generation and transmission of representative audio files as described above may be conducted periodically, but alternatively it may be contemplated that ambient sounds may be sampled and transmitted upon request as needed. The server may then store the audio file in association with the particular gaming station for analysis and generation of a zone baseline audio file for that same station.

In other embodiments the central server may be configured for example to continuously sample sounds with respect to each gaming station. Such continuous feedback may facilitate more sophisticated control techniques such as for example compensation for very temporary noise sources in substantially real-time, or on a longer-term basis such feedback may better allow for intelligent analysis by machine learning engines and algorithms as may be implemented in various ways which are known in the art.

Having transmitted a local baseline audio file, the gaming station next receives audio files from either or both of the neighboring stations and the central server (S33). In certain embodiments, the stations themselves may include program modules effective to analyze the local audio files from neighboring stations and generate their own zone baseline waveform that substantially identifies noise in the form of sound signatures not associated with the sampled sounds for that particular station, without the assistance of a master audio file with waveforms from the central server.

In embodiments as further described herein, however, the stations also receive data from the central server. In one exemplary embodiment, the individual stations generate their own audio waveforms for sound cancellation based on ambient sounds from the surrounding machines, while the central server provides commands that may, for example, include user-defined sound cancellation preferences or that may override sound cancellation of particular signatures (exceptions) as may be described further below. In another embodiment, the surrounding machines may only be made available for broadcasting of ambient audio files in the event of server communication failures or some equivalent, wherein the baseline audio file itself is typically generated by and received from the central server, as further described below (see FIG. 4 and steps S41-46).

In various embodiments, the gaming station further includes a graphical user interface on a gaming terminal or other equivalent devices for enabling a user to select general sound preferences or location-based profiles (S34). The gaming station may generate a list of selectable sounds for suppression or amplification, each of the sounds pertaining to a specific identifiable and actionable sound signature, or a range of sounds for example within a specific and actionable frequency. The user may be enabled to select sounds emitted from the gaming machine itself to be made louder, while simultaneously selecting sounds received from surrounding gaming machines to be suppressed. The user may further be enabled to select from any number of other sounds to be suppressed, as long as those sounds can reasonably be isolated and acted upon by the noise suppression functionality of the gaming station. Examples may include fans, mechanical meters, air conditioning units, general human conversation, or as implied above even specific individuals or conversations that may be closer, louder or otherwise separately identifiable with respect to the collective ambient conversation level. Outside of the context of casino floors as the gaming area, other identifiable sounds may be apparent such as for example the arrival or departure of airplanes in an airport, the clattering of dishes and glasses in a coffee shop, etc.

Figure 7:
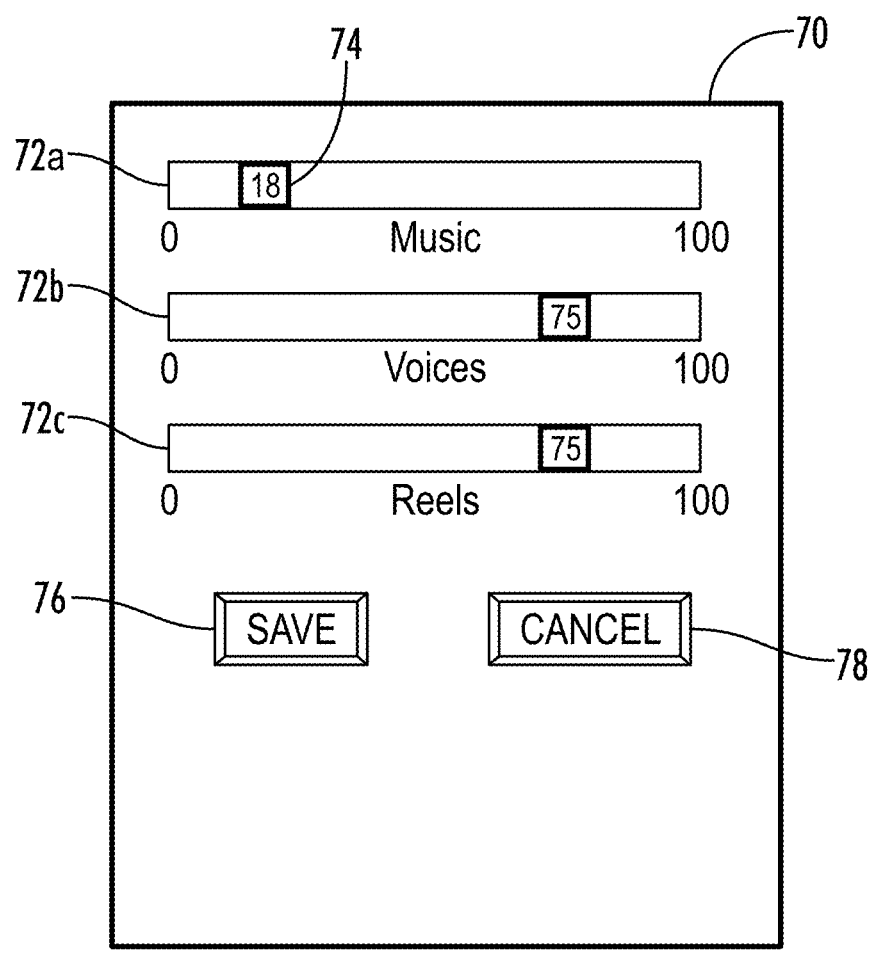
FIG. 7 is a graphical diagram representing an exemplary user interface in accordance with an embodiment as disclosed herein.

One exemplary such user interface 70 may be as represented in FIG. 7, including a number of independent noise suppression and/or amplification options 72 such as music 72a, human speech 72b and game-specific sounds (i.e., slot reels) 72c. A setting for each option 72 may be selectable by manipulating for example a slider button 74 where the interface is coupled to a pointing device such as a touch screen or mouse, or in alternative embodiments by providing a data entry box or an equivalent enabling the user to enter a number along an appropriate scale with respect to maximum and minimum noise cancellation settings. The interface 70 may further provide buttons enabling the user to save 76 the current state of user preferences to the gaming station and/or server, or to cancel 78 the current state of user preferences.

As but one alternative or additional feature, the gaming station may enable users to select from predefined profiles that are presented based on their current location, or perhaps via a sorting algorithm that presents profiles in order of most common usage, etc. The profiles may be associated with default noise suppression settings for that particular location (e.g., profiles generally associated with casinos, coffee shops, airplanes, etc.), previously established user preferences associated with that particular location, or an application of universal default user preferences to default settings for that location. The user may be enabled to selectably combine a universal personal preference profile with characteristics specific to a given location and have noise suppression settings generated automatically in accordance therewith.

The user may in various embodiments be presented with a default selection for that particular location and enabled by the gaming station to confirm or modify one or more preferences at that time. The gaming station may locally store the user selection data for extraction and implementation by internal noise suppression program module. Preferably, in cases where the user has a loyalty account that has been previously identified by the gaming station in association with the current user session, the gaming station may further upload the user selection data to the central server for remote storage in association with a digital user profile saved in the user account. Thereby, the server may automatically retrieve the user preferences and implement or otherwise identify and visually present the same user preferences for user confirmation at a later time when the same user begins a new session at the same location. The server may further collect user preferences from each user with respect to a given user station, zone or location, and apply advanced machine learning algorithms to further adapt the default noise suppression settings for the station, zone or location over time.

Figure 6:
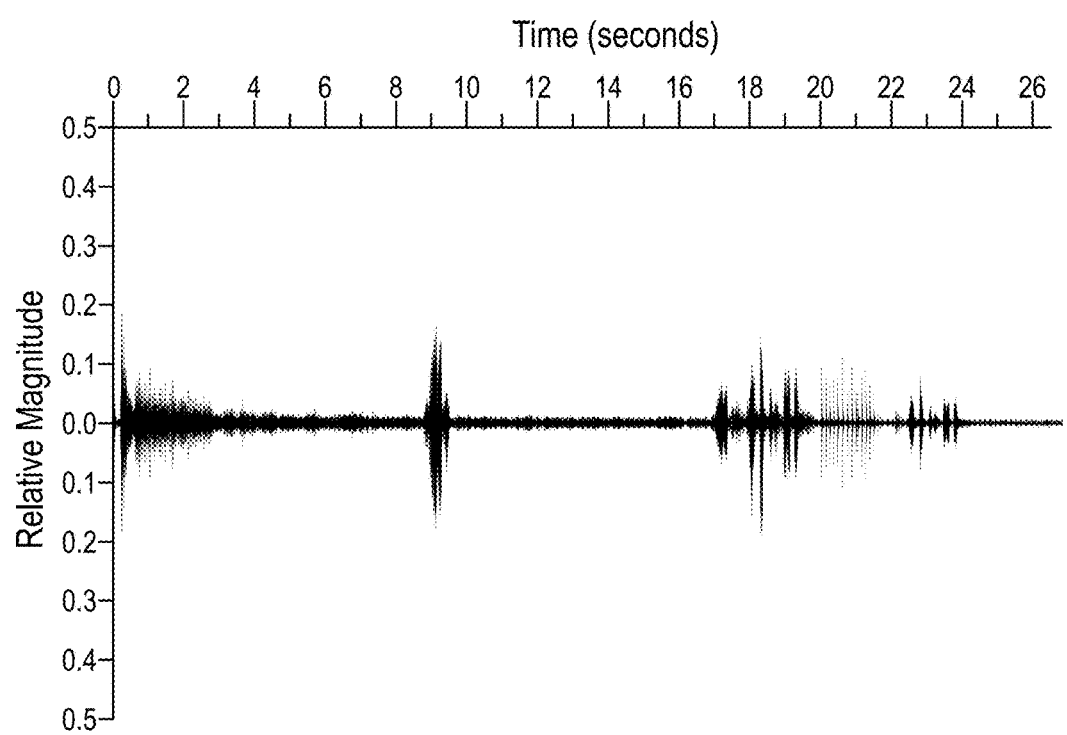
FIG. 6 is a graphical diagram representing an exemplary noise suppression waveform produced in accordance with an embodiment as disclosed herein.

The gaming station may then generate an audio output in the form of sound waves that are configured to suppress or cancel background noise or other user-selected noise (S35) while simultaneously amplifying user station-specific sounds. In various embodiments, the gaming station may automatically generate cancellation tones for any sounds that are clearly identifiable as external background noise with respect to the sounds projected from the machine, or other ambient sounds as they may be provided by, for example, the user and are not selected specifically for noise suppression. Certain of these cancellation tones may in some cases be overridden by user selection, or alternatively may be automatically applied and not even presented for user selection, such as for example a persistent background noise. An exemplary noise cancellation waveform is represented in FIG. 6, primarily addressing background noise in the form of standard human voice frequencies between about 80 Hz and about 3 kHz and of varying amplitude. Where sounds to be suppressed are too complex and/or numerous to be isolated, the cancellation tones may be generated based on an average or reference frequency within the frequency band, and 180° out of phase with respect to the reference frequency.

In determining which sounds to isolate and amplify, the gaming station may compare the received zone baseline waveforms to the locally generated baseline waveforms and extract any user-specific or gaming station-specific sound signatures identifiable as such (S36). These waveform(s) may then be amplified in the final product in the form of sound waves emitted from the gaming station and to the user, to better project only the desired sounds as opposed to any underlying noise (S37).

Figure 4:
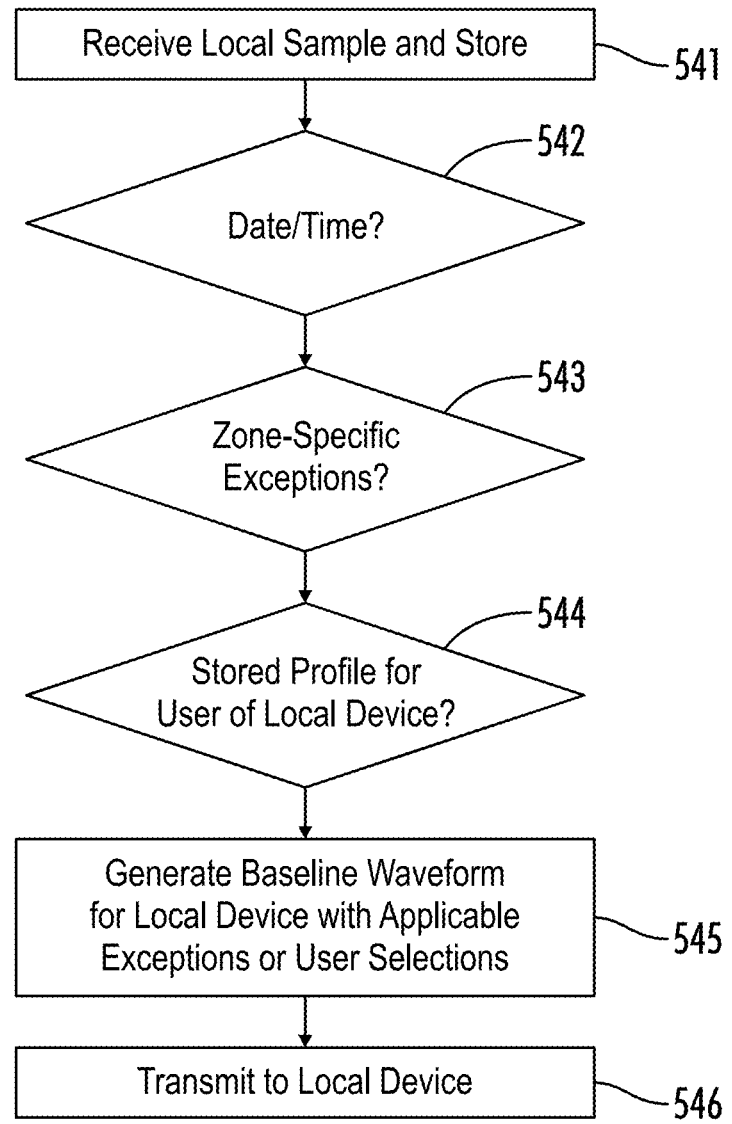
FIG. 4 is a flowchart representing an exemplary method of operation according to another embodiment.

Referring now to FIG. 4, an additional and exemplary method may now be described that is typically performed by the central server in parallel with the method described above, particularly between steps S32 and S33. The server process begins upon receiving and storing local audio files from gaming stations (S41). For the purposes of the description herein, the steps will be described as they pertain to a particular gaming station, but the same method may typically be performed substantially identically for each of the gaming stations at specific times, or may be sequentially performed for each of the gaming stations over time, or may be individually performed for gaming stations upon request, or startup, or at predetermined and periodic times.

The server may consider a number of parameters specific to the gaming station or other external conditions in determining a zone baseline audio waveform for that station. For example, the server may preferably tailor the baseline audio waveform in view of the date, time of day, and/or the location of the gaming machine relative the gaming area as a whole (S42). Ambient sounds on a casino floor may be reliably considered to vary somewhat, if not dramatically, with respect to, e.g., a Friday night as opposed to a Wednesday morning, or on 8 p.m. on New Year's Eve as opposed to 2 p.m. in the middle of October. Further, a gaming machine that is adjacent a primary entry/exit, and/or along primary walkways through the gaming floor, would reliably encounter more ambient sound than a relatively isolated machine. The server may also analyze the waveforms based on time to determine the delta between one hour and the next. Implementation of the delta could lead to a gradual dampening of the outside noise as opposed to an abrupt change. For example, it may be known in a particular instance that at 2:00 the fans in a location are enabled, and therefore prior to 2:00 the gaming machine starts introducing a fan cancellation tone which may be fully effectual once 2:00 is reached. The gaming machine may then further begin tapering the respective noise cancellation tone at 3:00 when it is known that the fan is or will imminently be stopping.

As described above, groups of gaming stations may collectively define "zones" that may be used by the server for this purpose as well (S43). For example, some zones may include gaming machines for which users are generally unlikely to converse with each other, but alternatively some zones may include machines that typically prompt some interaction among patrons and noise suppression might in these cases be more undesirable.

It may be desirable for the server to selectively allow announcements relating to a type of gaming machine to be provided for patrons only in that specific zone, such as for example in tournament applications.

It may further be desirable for the server to exclude (or allow for the exclusion of) typical sounds as are emitted by other gaming machines, but to allow (or deny the exclusion of) sounds related to "jackpots" or other equivalent incidents that may lend themselves to an overall aura of excitement. More dynamically, the server may be configured to identify "hot spots" on a gaming floor at any particular time and to generate baseline audio waveforms that exclude sounds generated from these "hot spots" from noise suppression by surrounding gaming stations. In this way, gaming stations may further be contacted in substantially real-time by the server with updates for application by their noise suppression program module to account for exciting developments in the casino at a given time. If the server analyzes the waveforms based on time to determine the delta between one hour and the next, as described above, the common noise threshold may be determined for any given time wherein it is possible to ascertain that an increase in a certain frequency was desirable and not the norm, and therefore should not be canceled.

Such analysis may be psychologically driven and may vary dramatically based on the gaming environment generally, the type of gaming machines, the clientele, etc., but generally stated this dynamic server functionality may be developed over time to optimize patron traffic patterns as well as an overall gaming environment.

It may even further be desirable to define zone-specific exceptions with respect to sounds projected from gaming stations inside of the zone, but to generate the zone baseline waveform presenting sounds projected from gaming stations outside of the zone for noise suppression. Again, this may for example be desirable for tournament applications, or specific arrays of gaming machines playing a collective-style game such as poker even outside of tournament applications.

Generally speaking, there may be certain exceptions that are defined by the server that extend to all zones, such as for example emergency announcements and/or alarms related to the entire gaming area. The server may therefore exclude such sound signatures or otherwise generate commands for inclusion in the audio file transmitted to the gaming machines to ensure implementation and to further deny their selection for exclusion by their respective users.

The server may receive in addition to or as included within the local audio file a user loyalty account number for a user of the gaming station. The server may subsequently extract any stored and relevant historical user preferences from an associated user profile (S44), and generate a baseline audio waveform for that gaming machine including or otherwise accounting for these preferences, any zone-specific exceptions, environmental parameters, etc. (S45). The baseline audio waveform and any associated commands or identifiers may then be transmitted to the respective gaming station for analysis and implementation (S46).

Rather than accounting for user preferences within the baseline audio waveform, the server may otherwise present the user preferences to the gaming machine for display to and confirmation by the patron, wherein the gaming machine may separately apply noise suppression upon confirmation of the relevant preferences.

Figure 5:
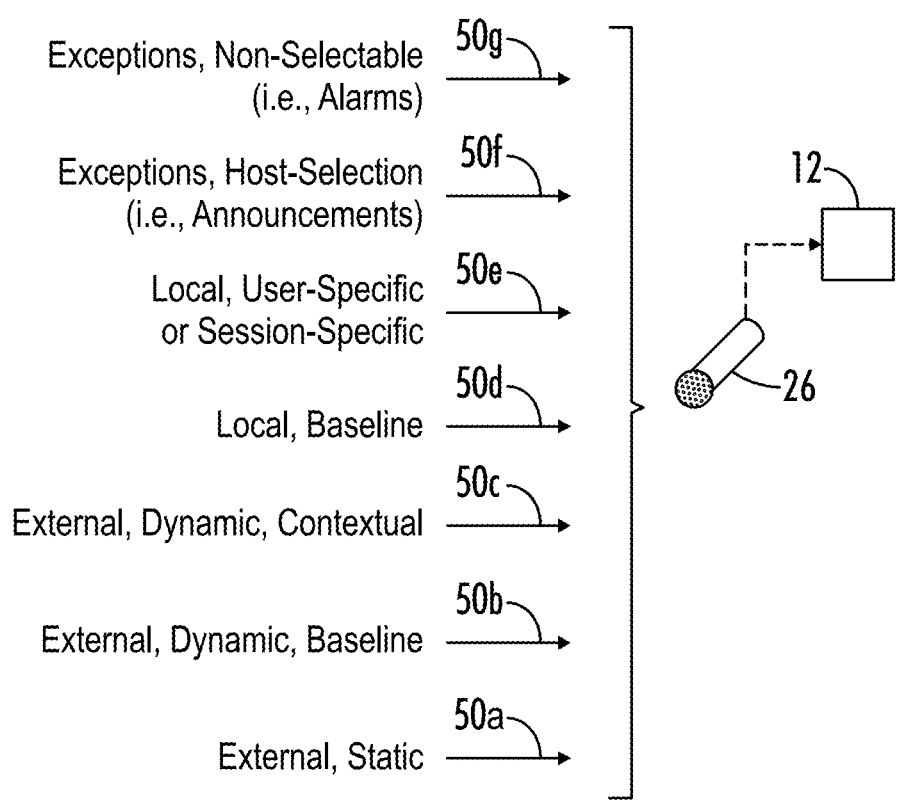
FIG. 5 is a diagram representing various exemplary identifiable sound signatures with respect to a gaming device in an embodiment as disclosed herein.

Referring now to FIG. 5, various exemplary types of ambient sound 50 are presented as may optimally be identifiable and actionable by noise suppression and amplification program modules of a gaming station in accordance with embodiments of the present invention. It may be understood that among the more difficult tasks for effective implementation of the present invention is proper identification and differentiation of noise (for suppression) with respect to desired sounds (for amplification).

External sounds that are received by the sound receiving devices (e.g., microphone array) may include static sounds (e.g., fans) 50$a$ and dynamic sounds 50$b$, 50$b$. Dynamic sounds may be broken down with respect to external "baseline" sounds 50$b$ such as those that are somewhat continuously generated by surrounding machines, and external "contextual" sounds 50$c$ such as those that are dependent on user activity. In various embodiments, the system may enable users to select sound signatures associated with each of these types 50$a$, 50$b$, 50$c$ for noise suppression, or alternatively the system may automatically suppress a range of sound including 50$a$ and 50$b$, while enabling the user to select from among a list of individual sound signatures which fall within the scope of 50$c$.

Locally-generated sounds that are received by the sound receiving devices may include local "baseline" sounds 50$d$ such as for example those that are somewhat continuously generated by the respective machine, and local user-specific or session-specific sounds 50$e$ such as for example those that are generated by a particular user or only in conjunction with execution of a particular game being played by that user. In some embodiments, the system may automatically seek to amplify sounds 50$e$ while enabling users to potentially select and suppress one or more sounds 50$d$ that are projected by the machine but not necessarily specific to the game being played, such as for example where the gaming station is part of a zone of machines that collectively play a certain music regardless of specific user activity.

Additional sounds that are externally generated but separately treated include selectable exceptions 50$f$ and non-selectable exceptions 50$g$. Selectable exceptions may include for example announcements that may be identified by an administrator as appropriate for one or more zones of gaming stations but not for the remainder of a gaming area. Therefore, such sounds may appropriately be identified in accordance with sounds 50$c$ for certain gaming stations, but otherwise identified in accordance with sounds 50$g$ for others. The non-selectable exceptions 50$g$ are those such as emergency announcements or alarms that are not selectable for noise suppression, and must generally be projected, if not even amplified, by each gaming station as needed.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A system for dynamically managing sound in a gaming environment, the system comprising:
   a plurality of gaming stations, wherein each of the gaming stations comprise a sound receiver and one or more sound emitters, and are disposed in a respective one of a plurality of zones;
   a server in communication with each of the plurality of gaming stations and configured to
   sample ambient sounds with respect to each of the plurality of zones,
   analyze ambient sounds for at least a first of the plurality of zones with respect to a profile for the first zone,
   identify one or more zone-specific sound exception signatures,
   direct one or more of the gaming stations disposed in the first zone to disable local suppression of the one or more zone-specific sound exception signatures, and
   direct the one or more of the gaming stations disposed in the first zone to emit sound waves associated with the one or more zone-specific sound exception signatures for which local suppression is not disabled.

2. The system of claim 1, wherein the server is further configured to direct the one or more of the gaming stations disposed in the first zone to emit sound waves effective to locally amplify sounds associated with the one or more zone-specific sound exception signatures.

3. The system of claim 1, wherein the server is further configured to:
   identify one or more sampled ambient sounds as persistent external sounds or temporary external sounds with respect to each zone, and
   automatically direct the emission of sound waves to locally suppress the persistent external sounds for a respective zone.

4. The system of claim 3, wherein the persistent external sounds are periodically identified based on a date, a time of day and the current location of the device.

5. The system of claim 4, wherein the persistent external sounds are compared to respective ambient noise thresholds with respect to any one or more of the date, time of day or current location of the device.

6. The system of claim 1, wherein the server is configured to analyze the ambient sounds for at least a first of the plurality of zones, and to dynamically identify abnormal ambient sounds with respect to a noise threshold for the first zone.

7. The system of claim 6, wherein the server is configured to analyze a change in the ambient sounds over time corresponding to a dynamic noise threshold for the first zone, wherein the noise threshold is dynamic in view of the date, time of day and/or location of the zone with respect to a gaming floor.

8. The system of claim 1, wherein the particular sounds are associated with jackpots for one or more gaming stations within the first zone.

9. A system for dynamically managing sound in a gaming environment, the system comprising:
   a plurality of gaming stations, wherein each of the gaming stations comprise a sound receiver and one or more sound emitters, and are disposed in a respective one of a plurality of zones;
   a server in communication with each of the plurality of gaming stations and configured to
   sample ambient sounds with respect to each of the plurality of zones,
   identify zone-specific exception sound signatures with respect to a dynamic noise threshold for at least a first of the plurality of zones, and
   direct one or more of the sound emitters disposed in at least one zone other than the first zone to locally amplify sounds associated with the identified zone-specific exception sound signatures for the first zone.

10. The system of claim 9, wherein the identified zone-specific exception sound signatures are associated with jackpots for one or more gaming stations within the first zone.

11. The system of claim 9, wherein the server is further configured to
   direct the one or more of the sound emitters disposed in at least one zone other than the first zone to emit sound waves effective to locally suppress one or more ambient sounds other than the identified zone-specific exception sound signatures.

12. The system of claim 9, wherein the server is further configured to:
   identify one or more sampled ambient sounds as persistent external sounds or temporary external sounds with respect to each zone, and
   automatically direct the emission of sound waves to locally suppress the persistent external sounds for a respective zone.

13. The system of claim 12, wherein the persistent external sounds are periodically identified based on a date, a time of day and the current location of the device.

14. The system of claim 13, wherein the persistent external sounds are compared to respective ambient noise thresholds with respect to any one or more of the date, time of day or current location of the device.

15. The system of claim 9, wherein the server is configured to analyze the ambient sounds for at least a first of the plurality of zones, and to dynamically identify zone-specific exception sound signatures with respect to a noise threshold for the first zone.

16. The system of claim 15, wherein the server is configured to analyze a change in the ambient sounds over time corresponds to a dynamic noise threshold for the first zone, wherein the noise threshold is dynamic in view of the date, time of day and/or location of the zone with respect to a gaming floor.

17. A method for dynamically managing sound in a gaming environment comprising a plurality of gaming zones, each zone including one or more sound receivers and one or more sound emitters, the method comprising:
   sampling ambient sounds with respect to each of the plurality of zones,
   identifying one or more zone-specific exception sound signatures with respect to a dynamic noise threshold for at least a first of the plurality of zones, and
   directing one or more of the gaming stations disposed in at least one zone other than the first zone to locally amplify sounds associated with the identified zone-specific exception sound signatures for the first zone.

18. The method of claim 17, wherein the identified abnormal ambient sounds are associated with jackpots for one or more gaming stations within the first zone.

19. The method of claim 17, further comprising directing one or more of the sound emitters disposed in at least one zone other than the first zone to emit sound waves effective to locally suppress one or more ambient sounds other than the identified zone-specific exception sound signatures.

20. The method of claim 17, further comprising analyzing a change in the ambient sounds over time for at least a first of the plurality of zones, to identify zone-specific exception sound signatures with respect to a noise threshold for the first zone that is dynamic in view of the date, time of day and/or location of the first zone with respect to a gaming floor.

* * * * *